Feb. 6, 1940.　　　L. O. CARLSEN　　　2,188,996
INDEXING MECHANISM
Filed Aug. 23, 1938　　　7 Sheets-Sheet 1

INVENTOR
Leonard O. Carlsen
BY
ATTORNEY

Feb. 6, 1940.   L. O. CARLSEN   2,188,996
INDEXING MECHANISM
Filed Aug. 23, 1938   7 Sheets-Sheet 2

INVENTOR
Leonard O. Carlsen
BY
ATTORNEY

Feb. 6, 1940.  L. O. CARLSEN  2,188,996
INDEXING MECHANISM
Filed Aug. 23, 1938  7 Sheets-Sheet 6

INVENTOR
Leonard O. Carlsen
BY
ATTORNEY

Feb. 6, 1940.　　　L. O. CARLSEN　　　2,188,996
INDEXING MECHANISM
Filed Aug. 23, 1938　　　7 Sheets-Sheet 7

INVENTOR
Leonard O. Carlsen
BY
ATTORNEY

Patented Feb. 6, 1940

2,188,996

UNITED STATES PATENT OFFICE 2,188,996

INDEXING MECHANISM

Leonard O. Carlsen, Rochester, N. Y., assignor to Gleason Works, Rochester, N. Y., a corporation of New York Application August 23, 1938, Serial No. 226,320

12 Claims. (Cl. 90—57)

The present invention relates to indexing mechanisms and particularly to indexing mechanisms of the type employed on machines for producing gears.

One object of this invention is to provide an indexing mechanism which may be operated at high speed without shock or vibration.

Another object of the invention is to provide an indexing mechanism in which the indexing operation is positively controlled at all times and all danger of skipping a tooth is eliminated.

Other objects of the invention will be apparent hereinafter from the specification and from the recital of the appended claims.

Two different embodiments of the invention are illustrated in the accompanying drawings, in which:

Fig. 10 is a diagrammatic view illustrating the interconnection between the locking means and the work spindle rotating means in both embodiments of the invention.

Figure 1:
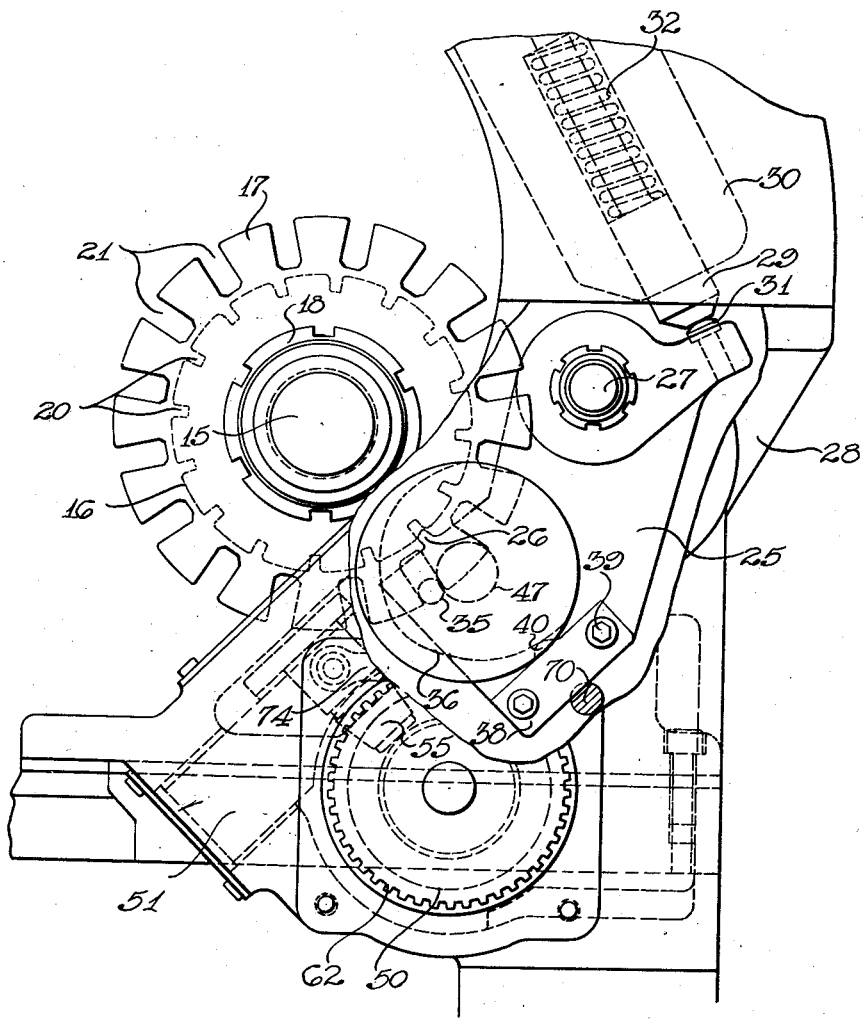
Fig. 1 is a fragmentary end elevation of an indexing mechanism built according to one embodiment of the invention.

The indexing mechanism of the present invention is of the notched plate type and may be employed either on a generating machine or on a machine in which the cutting operation is performed without a generating roll and the work spindle remains stationary except for the indexing operation. The embodiment of the invention illustrated in Figs. 1 to 4 inclusive is for a machine that operates without generating roll and will first be described.

15 denotes the work spindle of a gear cutting or gear grinding machine upon which the indexing mechanism of this invention is to be used. A notched index plate 16 and a Geneva wheel 17 are keyed or otherwise secured to the work spindle 15. They are held against axial movement relative to the work spindle by a lock-nut 18.

Both the index plate 16 and the Geneva wheel 17 have as many notches as there are tooth spaces in the gear to be produced. The notches in the index plate are denoted at 20 while those in the Geneva wheel are designated at 21.

25 denotes the lock-lever. This lever is provided with an integral tooth or dog 26 that is adapted to engage in a notch 20 of the index plate 16 to lock the work spindle against rotation during formation of the tooth spaces of the gear which is being cut or ground upon the machine on which the index mechanism is used. The lock-lever 25 is pivotally mounted on a pin 27 that is secured in the work head or support 28 of the machine.

The locking dog 26 is continuously urged toward locking position by a spring-pressed plunger 29. This plunger 29 is suitably housed in a boss 30 that is formed integral with the work head or support 28. The plunger engages a hardened contact-tip 31 that is secured in the tail of the lock lever 25. The plunger is actuated by the coil spring 32.

To effect indexing of the work spindle, the locking dog 26 is disengaged from the index plate 16 and the work spindle is rotated through the angular distance between successive notches of the index plate 16 and then the work spindle is relocked by reengaging the lock dog with a new notch of the index plate. The means for rotating the work spindle includes a pin 35 and a cam 36. The pin is adapted to be engaged periodically with a notch of the Geneva wheel 17. It is secured to the cam to project beyond the front face of the cam, as clearly shown in Figs. 2 and 4.

There is a block 38 secured by screws 39 to one side of the index lock lever 25. This block is formed with a nose 40. The cam 36 is adapted to be engaged with the nose 40 so that as the cam is rotated in engagement with this nose, the locking dog 26 will be disengaged from the index plate to unlock the work spindle and permit of the indexing operation.

The cam is secured by screws 42 and a dowel-pin 43 (Fig. 2) to a spur gear 45 and to the enlarged head 46 of a shaft 47. The shaft 47 is mounted for axial reciprocating movement in a bracket or support 48 that is secured to or integral with the work head 28.

Figure 2:
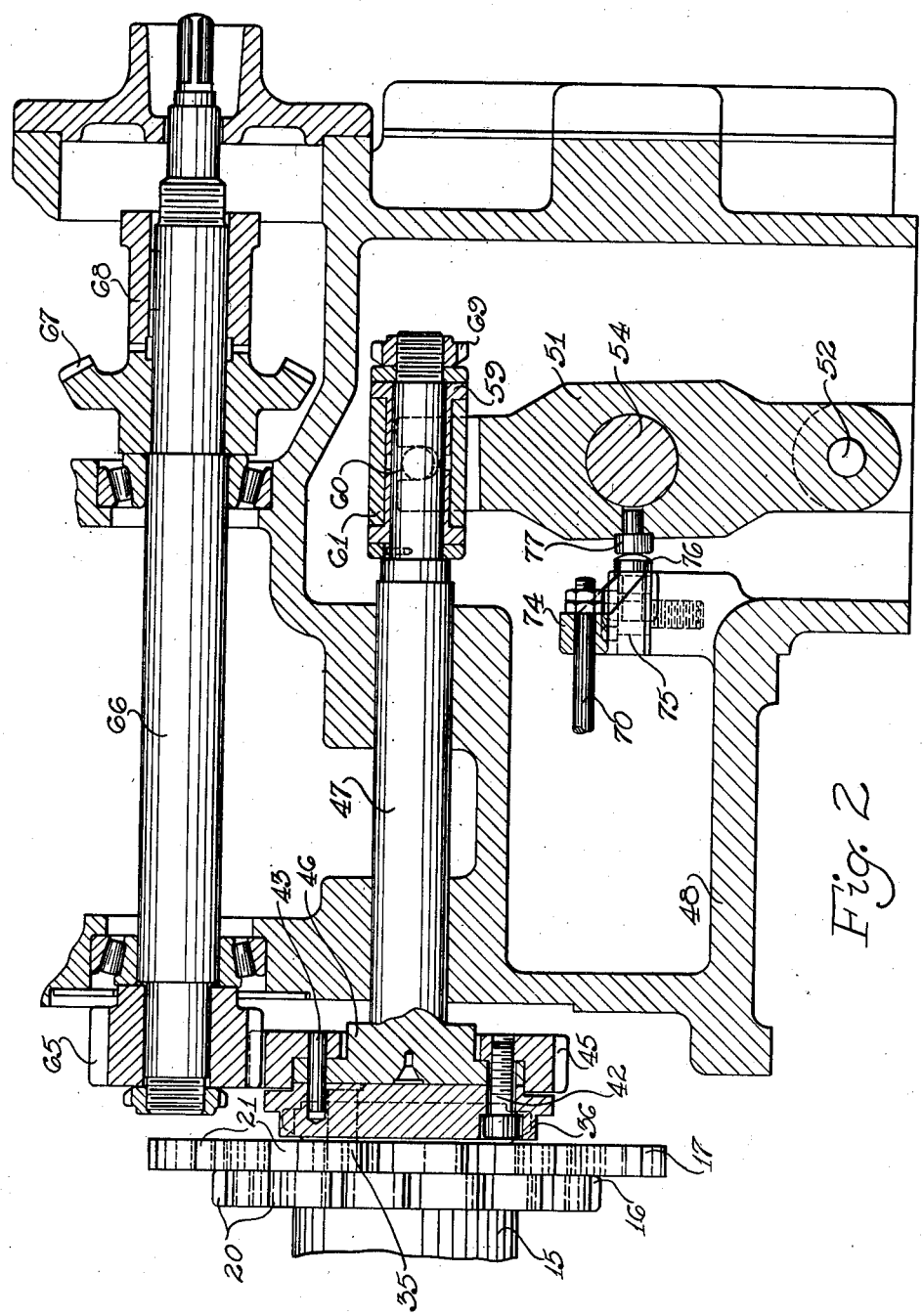
Fig. 2 is a fragmentary sectional view showing details of this mechanism and particularly the means for rotating the work spindle, after it has been unlocked, to effect indexing.
Figure 3:
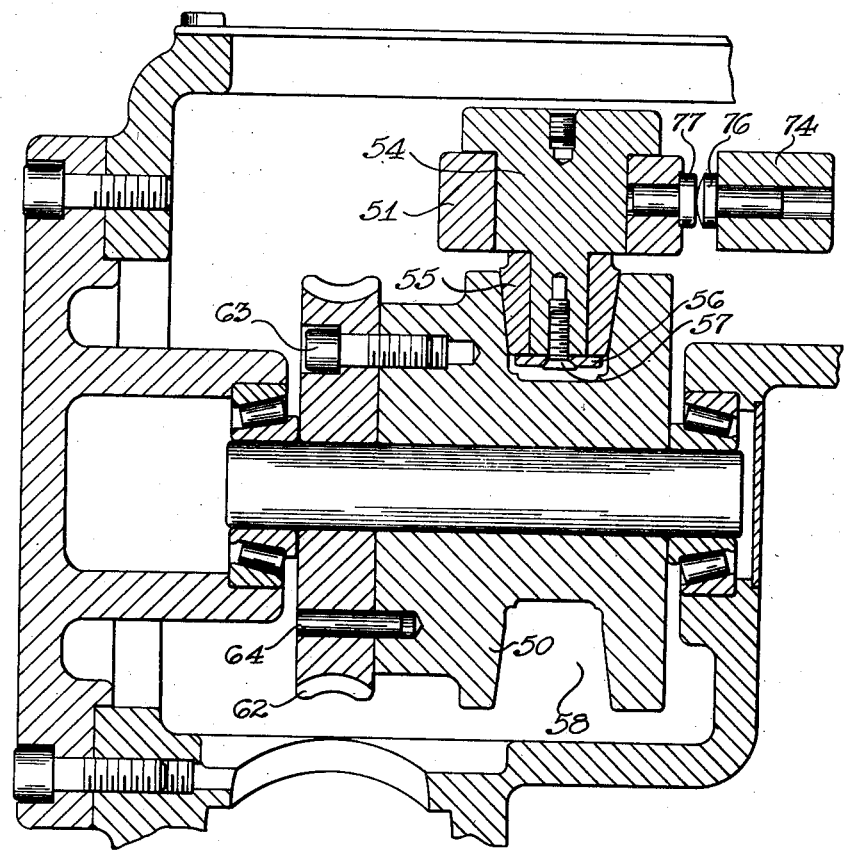
Fig. 3 is a fragmentary sectional view showing the same and cooperating parts for shifting the work spindle rotating mechanism into and out of operative position.

The reciprocatory movement of the shaft 47 is effected by rotation of a cam 50 (Figs. 1 and 3). There is a yoke member 51 (Figs. 2 and 3) pivotally mounted at its lower end upon a pin 52 which is secured in the support 48. Mounted in this yoke member is a stud 54 on which is journaled a tapered roller 55 that is held on the stud by a washer 56 and screw 57. The roller 55 engages in the track way 58 of the cam 50 so that as the cam 50 is rotated, the yoke member may be swung about its pivot 52.

The yoke member is bifurcated at its upper end and each furcation is notched to engage a pin 60. The pins 60 project from opposite sides of a sleeve 61 that is journaled by means of a bushing 59 on the shaft 47. The bushing is held against axial movement relative to the shaft by the nut 69 that threads on the shaft. Through rotation of the cam 50, then, the shaft 47 is moved to and fro to move the pin 35 and cam 36 into and out of operative engagement with the Geneva wheel 17 and nose 40 of lock lever 25, respectively. The cam 50 is driven from any suitable source of power by means of the worm wheel 62 which is secured to one side of the cam by screws 63 and the dowel-pin 64.

The gear 45 meshes with a long-faced pinion 65 which is keyed or otherwise fastened to a shaft 66 that is journaled in the support 48 parallel with the shaft 47. The shaft 66 is driven from a bevel gear 67 through a clutch member 68.

In operation, the bevel gear 67 and shaft 66 are preferably rotated continuously in time with the worm wheel 62 which rotates the cam 50. During formation of the tooth surfaces of the gear on the machine, the index mechanism is locked up by the locking dog 26 and the work spindle 15 is therefore held against rotation. For this purpose, the track 58 of the cam 50 may be formed with a dwell portion in which the roller 55 travels during formation of a tooth surface of the gear. Periodically, however, the cam 50 operates to swing the yoke member 51 about its pivot 52 to shift the shaft 47 forwardly to bring the rotating cam 36 into operative engagement with the nose 40 of the lock lever 25 and to bring the pin 35 simultaneously into operative relation with the Geneva wheel 17. As the cam 36 rotates in operative position, a rise in the cam track causes the lock lever 25 to be swung about its pivot pin 27 to disengage the locking-dog 26 from the index plate 16. The pin 35 is so located on the cam 36 that, at the moment of disengagement of the locking-dog from the index plate, the pin 35 enters a notch 21 of the Geneva wheel, as shown in Figs. 1 and 10. As the cam 36 continues to rotate, then, the pin 35 revolves the Geneva wheel through the angular distance between two successive notches of the Geneva wheel, thus indexing the work spindle. At the end of the indexing movement, the nose 40 of the locking lever 25 rides down off of the high part of the cam 36 and, as the pin 35 moves out of engagement with the Geneva wheel, the dog moves into a new notch of the index plate to relock the work spindle against rotation. As soon as the indexing has been completed, the cam 50 operates to move the shaft 47 rearwardly again to withdraw the cam 36 and pin 35 from operative position. The indexing cycle is thus completed.

Figure 4:
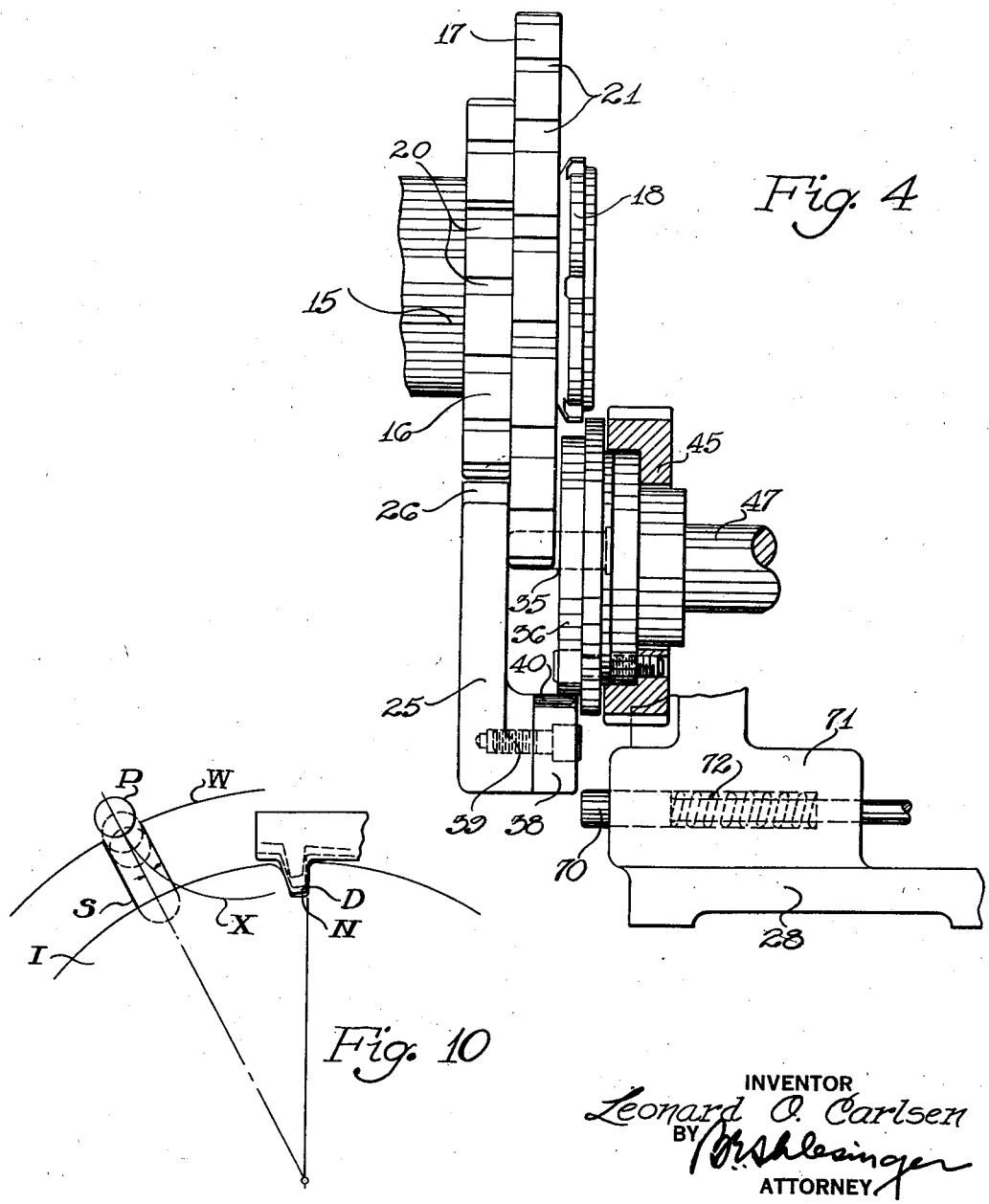
Fig. 4 is a fragmentary side elevation, looking at the indexing mechanism from a position about 90° from that shown in Fig. 2.
Figure 5:
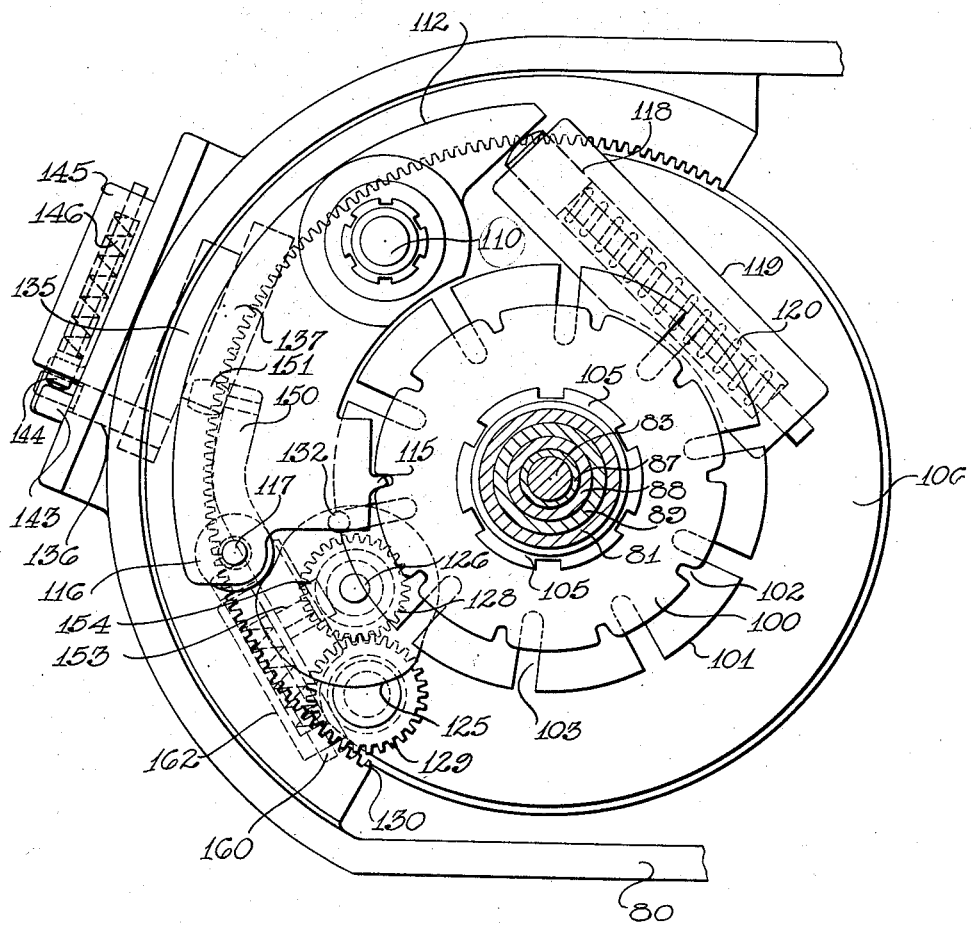
Fig. 5 is a fragmentary end elevation of an indexing mechanism made according to a further embodiment of the invention and particularly adapted for use on machines that operate according to the generating principle.
Figure 6:
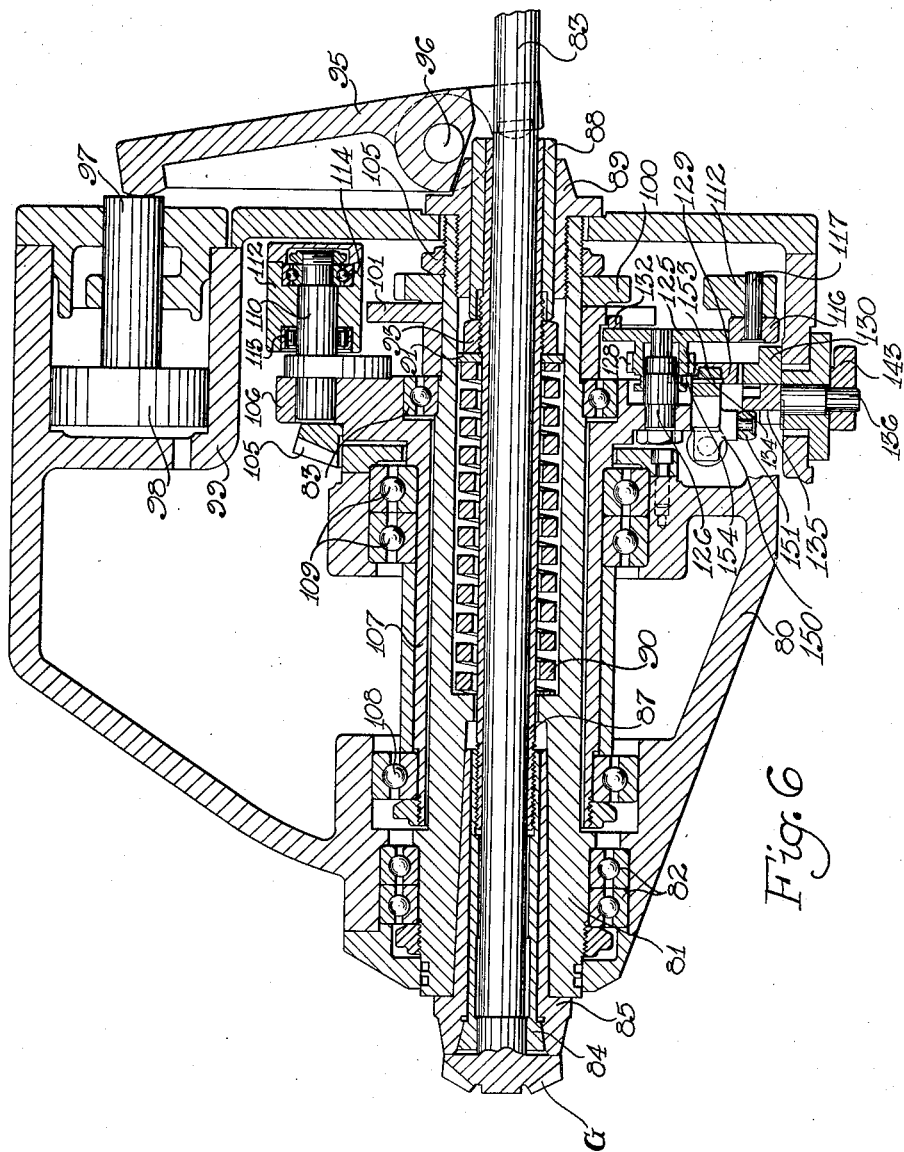
Fig. 6 is a sectional view through the work spindle and work head of a machine equipped with the indexing mechanism shown in Fig. 5.

To prevent the locking dog 26 from jumping out of engagement with the index plate until the dog is positively disengaged therefrom, a spring pressed rod 70 (Figs. 1, 2 and 4) is provided. This rod is adapted to engage behind the block 38 when the locking dog 26 is in locking position. The rod 70 slides in a block 71 which is secured to the work support 28. It is normally pressed into operative position by a coil spring 72 that surrounds the rod and is interposed between the head of the rod and the end wall of the bore or recess in which the rod slides. The rod 70 is secured at its rear end to a lever 74 (Fig. 2). The lever 74 is pivoted intermediate its ends upon the support 48 by means of a pin 75. At the end opposite that which is connected to the rod 70, the lever carries a hardened contact member 76 which engages with a hardened contact member 77 that is secured in one side of the yoke member 51. Thus, as the yoke member 51 is rocked by the cam 50 to move the shaft 47 to and from operative position, the lever 75 is rocked to move the rod 70 from and to operative position. In Fig. 4, the locking dog 26 is shown out of operative position and the rod 70 is in the withdrawn position. When the locking dog 26 is reengaged with the index plate 16, however, the rod 70 is moved forward by the movement of the yoke member 51 so that it engages behind the block 38 to assist in holding the locking dog 26 in locking position.

The indexing mechanism above described is for a machine where the work spindle is stationary during formation of the tooth spaces of a gear. The indexing mechanism illustrated in Figs. 5 to 9 inclusive is for a machine of the generating type where the work spindle rotates during formation of the tooth spaces of the gear. The latter index mechanism will now be described.

80 denotes the work head of a gear generating machine. The work spindle 81 of the machine is suitably journaled on anti-friction bearings 82 and 83 in this work head. The gear which is to be cut or ground is denoted at G. It is of the long shank type, being provided with an integral shank or shaft denoted at 83. This work piece is secured by a collet 84, which may be of standard construction, in an arbor 85 that is mounted in the bore of the work spindle. The collet is threaded to a sleeve 87, which is mounted at its rear end in the bushing 88. The bushing 88 is in turn mounted in a thimble 89 that is threaded in the rear end of the work spindle.

A coiled spring 90, that is interposed between a shoulder formed in the work spindle and a washer 91, serves to urge the sleeve 87 and collet 84 rearwardly to clamp the work against rotation relative to the work spindle. The washer 91 seats against the nut 93 that is threaded on the sleeve 87. A bifurcated lever 95 is provided for releasing the chucking mechanism. This lever is pivoted at 96 on the work head 80 and the furcations formed at one end of the lever straddle the shank 83 of the work piece and engage the end face of the sleeve 87. The other end of the lever engages the end face of the rod or stem 97 of a piston 98. This piston is mounted to reciprocate in a cylinder 99 that is formed integral with the work head 80. The piston 98 is adapted to be actuated by fluid pressure. When it is moved rearwardly, the lever 95 is moved clockwise about its pivot 96 to force the sleeve 87 forwardly against the resistance of the spring 90 to release the collet 84 and dechuck the work.

The indexing mechanism of the embodiment illustrated includes a notched index plate 100 and a Geneva wheel 101. The index plate 100 is formed with as many notches 102 as there are tooth spaces in the gear G which is to be cut or ground. The Geneva wheel 101 also has as many notches 103 as there are tooth spaces in the gear G. The index plate 100 and the Geneva wheel 101 are keyed or otherwise secured to the work spindle 81. They are held against axial movement relative to the spindle by a nut 105 that is threaded on the spindle.

The generating roll is imparted to the work spindle through a bevel gear segment 105. This segment, as usual, is driven in time with the motion of the cradle of the machine. The segment 105 is secured in any suitable manner to the head 106 of a sleeve member 107 that is journaled on anti-friction bearings 108 and 109 in the work head. There is a pin 110 secured in any suitable manner in the head 106 of the sleeve member 107. An index lock lever 112 is pivotally mounted on this pin 110 by means of suitable anti-friction bearings 113 and 114.

The lock lever 112 carries a locking dog 115 that is adapted to engage in the notches 102 of the index plate 100. The locking lever 112 also carries a roller 116, by means of the pin 117. The locking dog is constantly urged into engagement with the index plate 100 by a spring pressed plunger 118 that is housed in a boss 119 which is formed integral with the head 106 of the sleeve member 107. The plunger 118 is actuated by a coil spring 120. The plunger engages with the tail of the lock lever 112.

The roller 116 is adapted to be engaged with the periphery of a cam-member 125. This cam-member is mounted to slide upon a stud 126 that is secured in the head 106 of the sleeve member 107. The cam-member is integral with a pinion 128. This pinion meshes with a long-faced gear 129 that is mounted on a stud 131 which is also secured in the head 106. The gear 129 meshes with an internal gear segment 130. The segment is mounted coaxially of the work spindle and may be formed integral with the work head 80. It is stationary relative to the head 106 and bevel gear segment 105. Hence, as the segment 105 rocks in one direction or the other, the gear 129 rolls in one direction or the other on the segment 130 and imparts corresponding rotation to the pinion 128 and the cam 125.

The cam 125 carries a pin 132, that is adapted to be brought into operative relation with a notch 103 of the Geneva wheel 101 when the cam itself is brought into operative engagement with the roller 116 of the lock lever 112.

The movement of the cam 125 into and out of operative position is effected by reciprocation of the sleeve 134 with which both the cam 125 and pinion 128 are formed integral. This reciprocatory movement is effected by the relative rotary movement between the head 106 of the sleeve member 107 and the work head 80. There is a lever 135 secured to one end of a pin 136 that is rotatable in the work head 80. A guide member 137 is formed integral with one side of this lever 135. This guide member 137 (Fig. 9) has a guide-way 138 at one side thereof that terminates in a slabbed off portion 139. At its opposite side, the guide member 137 is formed with guide-ways 140 and 141 which are inclined at an obtuse angle to one another. The guide-way 140 makes a sharp acute angle with the guide-way 138 and the guide-way 139 makes an acute angle with the guide-way 141.

Figure 7:
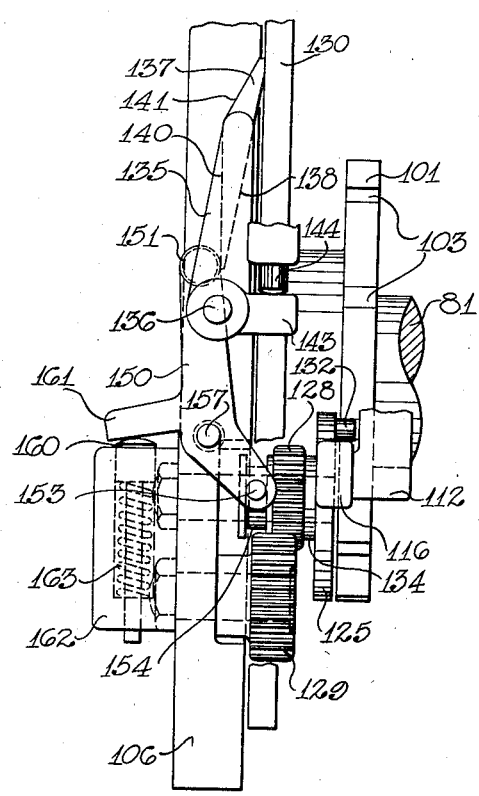
Fig. 7 is a fragmentary side elevation of the indexing mechanism itself, showing the parts in position for rotating the work spindle to effect indexing thereof.

Secured to the pivot pin 136 is an arm 143. A spring-pressed plunger 144 engages this arm to constantly urge the lever 135 in a clockwise direction about its pivot 136 to hold the slabbed off portion 139 of the guide member 137 against one side face of the segment 130, as shown in Fig. 7. The plunger 144 is housed in a boss 145 that is secured to the work head 80 and the plunger is held in engagement with the arm 143 by the coil spring 146.

Pivotally mounted upon the head 106 of the sleeve member 107 is a lever 150. There is a roller 151 carried in one arm of this lever. This roller is adapted to ride on the ways 138, 139, 141, and 140 of the guide member 137, as the head 106 oscillates back and forth in the generating roll of the machine. There is a pin 153 mounted in another arm of this lever. This pin carries a shoe 154 (Figs. 5 and 6) which engages in a peripheral groove or recess 155 that is formed in the sleeve 134.

The lever 150 is normally urged in a clockwise direction, about its pivot 157 by a spring-pressed plunger 160 which engages with the lug 161 that is formed integral with the lever and that projects from one side of the same. The plunger 160 is housed in a boss 162 that is formed integral with the head 106 of sleeve member 107. The plunger is constantly held in engagement with the lug 161 by action of the coil spring 163.

Figure 8:
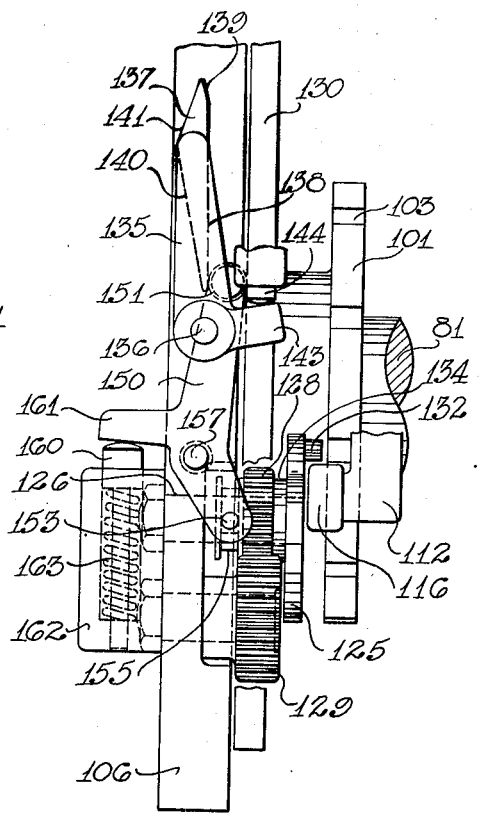
Fig. 8 is a corresponding view, showing the work spindle rotating mechanism out of operating position.
Figure 9:
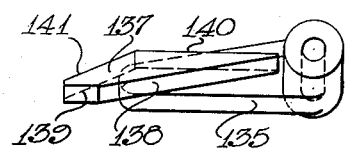
Fig. 9 is a perspective view of the deflector dog that controls the position of the work spindle rotating mechanism.

The operation of the index mechanism of Figs. 5 to 9 inclusive will be obvious from the preceding description but may now be briefly summed up. During formation of the tooth surfaces of the work piece G, the index mechanism is locked up, that is, the index lock dog 115 is in engagement with one of the notches 102 of the index plate 100 so that the work spindle 81 will be rotated by the bevel gear segment 105 to produce the generating roll of the work. During this time the parts will be in positions shown in Figs. 5 and 8. The head 106 of the sleeve member 105 will, at this time, be rotating in a clockwise direction as viewed in Fig. 5 and the roller 151 of the lever 150 will be riding on the portion 138 of the relatively fixed guide member 137 as shown in Fig. 8. The cam 125 and pin 132 will at this time be held out of operative position by operation of the spring-pressed plunger 160 which is free, at this time, to rock the lever 150 in a clockwise direction about its pivot 157. During the rotation of the head 106, the gear 129 will roll on the segment 130 as already described and impart rotation to the pinion 128, causing the cam 125 to rotate on its axis, but during the clockwise rotation of the head 106, the rotary movement of the cam 125 will be an idle movement because the cam will then be out of engagement with the roller 116 and the pin 132 carried by the cam will be out of registry with the Geneva wheel 101.

During the continued clockwise movement of the head 106, the roller 151 will move over the guide surfaces 138 and 139 of lever 135. At the end of this movement the roller 151 will ride clear of the guide surface 139. As soon as this happens, the plunger 144 will operate to swing the lever 135 and the guide member 137 from the position shown in Fig. 8 to that shown in Fig. 7 where the slabbed off portion 139 of the guide-member seats against one side surface of the segment 130. The parts will so be arranged that this will happen before the reversal of the direction of roll of the machine takes place.

When the roller 151 comes back into engagement with the guide-member 137, then, on the reverse roll of head 106, the roller will ride up on the surface 141 of the relatively fixed guide-member with the result that the lever 150 will be swung in a counter-clockwise direction about its pivot 157 to move the cam 125 into operative engagement with the roller 116 and bring the pin 132 into operative relation with the Geneva wheel 101. In the further return roll of the head 106, then, the rotating cam 125 will cause the lock lever 112 to be swung about its pivot 110 to disengage the locking dog 115 from the index plate 100. The pin 132 is so located on the cam 125 that it enters a slot 103 of the Geneva wheel 101 as the locking dog 115 moves out of engagement with the index plate 100. Thus, as the index plate is being unlocked, the pine 132 moves into position to drive the Geneva wheel 101 to rotate the work spindle 81 relative to the bevel gear segment 105 and head 106 to effect indexing of the work spindle.

At the end of the indexing movement, the roller 116 rides down off of the high part of the cam 125 and, the lock-dog moves into a new notch of the index plate 100 to relock the work-spindle again to the head 106 and segment 105 so that the work spindle again rotates therewith. As the lock-dog thus moves into engaging position, the pin 132 begins to move out of engagement with the Geneva wheel 101 so that, when the wheel is locked up again, the pin no longer drives.

Fig. 7 shows the positions of the parts near the end of the return roll when the roller 151 is still riding on the portion 140 of guide 137 and the cam 125 and pin 132 are still in operative positions.

After the roller has ridden clear of the lower end of the guide surface 140 of guide member 137, the spring-pressed plunger 160 operates to swing the lever 150 about its pivot 157 again to disengage the cam 125 from the roller 116 and withdraw pin 132 from operative position. The indexing cycle is thus completed. The work spindle is again locked up. The direction of roll is again reversed and the generating roll begins anew with the roller 151 travelling on the portion 138 of the track member 137 as shown in Fig. 8.

It will be noted that during the indexing operation itself with the second described embodiment of the invention, the lock-lever 112 is moving in a counterclockwise direction with the head 106 while the Geneva wheel 101 and index plate 100 are moving in a clockwise direction under actuation of the gearing 130—129—128 and pin 132. Hence that notch 102 of the index plate, which is next to be engaged by the lock-dog 115, and the lock-dog 115 will be moved toward one another and the actual indexing operation itself is effected in a much shorter time than with the mechanism of the first described embodiment of my invention where the lock-dog remains relatively stationary during indexing and the index plate itself must be moved through the whole angle between two successive notches of the plate before indexing is completed.

With either embodiment of the invention, the indexing is positively controlled at all times. This is clearly illustrated in Fig. 10. The notches N in the index plate I are made of preferably truncated wedge shape and the locking dog D is also made of preferably truncated wedge shape. Thus as soon as the locking dog begins to move out of engagement with a notch of the index plate, its sides begin to clear the sides of the notch as clearly illustrated by the successive dotted line positions of the dog in Fig. 10, which indicate successive positions of the dog as it moves out of operative position.

Now, the notches S of the Geneva wheel W are radial of the axis of the work spindle just as are the notches of the index plate. The pin P can move a considerable distance into a notch S of the Geneva wheel, then, before much movement is imparted to the wheel. This is shown clearly in Fig. 10 where successive positions of the pin, as it moves into a notch of the wheel are indicated in dotted lines and the path of movement of the pin in the indexing operation is indicated generally at X.

The construction of the index mechanism is such, then, that the pin P can enter a notch S of the Geneva wheel before the dog D is fully disengaged from a notch N of the index plate. Thus the pin will be in position to control the movement of indexing before the locking dog has fully released its control of the position of the index plate and work spindle.

With the index mechanism of this invention, full control is maintained at the end of the indexing operation, also. The locking dog D can move into a notch N of the index plate in the reverse of the movement illustrated in Fig. 10 before the pin P has completely moved out of engagement with a notch S of the Geneva wheel. This is true because the sides of the locking dog D clear the sides of a notch N until the locking dog is fully seated and because the pin P at the end of its indexing movement will again be moving approximately radially and imparting little or no movement to the Geneva wheel. Thus the locking dog D may be moved into position to control the position of the work spindle before the pin P releases control of the Geneva wheel.

The indexing mechanism of the present invention, therefore, is positive in its action and positive in its control. It constitutes a marked improvement, then, over notched plate index mechanisms heretofore used. In prior-type notched plate index mechanisms, the locking dog has ordinarily had to be disengaged before the rotating mechanism could be engaged and in prior-type notched plate index mechanisms, the locking dog has been allowed to drop back onto the periphery of the index plate before the indexing operation is completed so that the dog might enter the next notch of the index plate under spring-pressure when that notch registered with the dog. One objection to prior types of notched plate index mechanisms is the frequency of failure of the mechanism to index properly when operated at high speeds. The locking dog will ratchet over the notch of the index plate and not enter it. This is impossible with the indexing mechanism of the present invention since the indexing is positively controlled at all times and the locking dog is moved into a notch of the index plate before the pin is fully out of engagement with the Geneva wheel.

While the invention has been described in connection with two different embodiments thereof, it will be understood that it is capable of still further modification. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In an indexing mechanism, a notched plate, a locking dog adapted to engage the plate to hold the plate against rotation, a Geneva wheel operatively connected to the plate, a rotatable cam for periodically disengaging the locking dog from the plate, a pin operatively connected to the cam to rotate therewith and adapted to engage the Geneva wheel to rotate said wheel, and means for rotating the cam.

2. In an indexing mechanism, a notched plate, a locking dog adapted to engage the plate to hold the plate against rotation, a Geneva wheel operatively connected to the plate, a rotatable cam, a pin operatively connected to the cam to rotate therewith and adapted to engage the Geneva wheel to rotate said wheel, means for rotating the cam, and means for periodically moving the cam to cause it to engage the locking dog and to move the pin simultaneously into operative relation with the Geneva wheel whereby, on continued rotation of the cam, the locking dog is disengaged and the wheel is rotated.

3. In an indexing mechanism, a notched plate, a locking dog adapted to engage the plate to hold the plate against rotation, a Geneva wheel operatively connected to the plate, a rotary cam, a pin secured to one face of the cam, means for rotating the cam, and means for periodically shifting the cam axially to bring the cam into operative engagement with the locking dog and the pin into operative relation with the Geneva wheel whereby, as the cam rotates, the locking dog is disengaged and the pin engages a notch of the Geneva wheel to rotate the wheel to effect the indexing movement, said last named means being operative to retract the cam axially when the indexing operation is completed.

4. In a machine for producing gears, the combination with a rotatable work spindle and a support in which the work spindle is journaled, of an indexing mechanism comprising an index plate and a Geneva wheel, each of which is secured to the spindle, a locking dog adapted to engage a notch of the index plate to hold the plate against rotation, a rotatable cam, a pin carried by said cam, means for rotating the cam, means for moving the cam axially periodically in one direction to cause the cam to engage the locking dog and to move the pin simultaneously into operative relation with the Geneva wheel whereby, on continued rotation of the cam, the locking dog is unlocked and the pin rotates the Geneva wheel to effect indexing of the work spindle, said last named means being operative also to retract the cam axially when the indexing operation is completed.

5. In a machine for producing gears, the combination with a rotatable work spindle and a support in which the work spindle is journaled, of an indexing mechanism comprising an index plate and a Geneva wheel, each of which is secured to the spindle, a locking dog adapted to engage a notch of the index plate to hold the plate against rotation, a rotatable cam, a pin carried by said cam, means for rotating the cam, and means operable in time with the cam rotating means for reciprocating said cam axially to move the cam and pin alternately into and out of operative relation with the locking dog and Geneva wheel, respectively, so that when the cam is in operative position, the locking dog will be disengaged by the cam in its rotation and the Geneva wheel will be rotated by the pin to index the work spindle.

6. In a machine for producing gears, the combination with a rotatable work spindle, an arm oscillatably mounted thereon, and means for oscillating said arm, of an indexing mechanism comprising an index plate and a Geneva wheel, each of which is secured to the work spindle, a locking dog mounted on said arm and adapted to engage a notch of the index plate, a cam rotatably and reciprocably mounted on said arm and adapted to be moved into engagement with the locking dog to release the same, a pin carried by said cam adapted to be moved into operative relation with the Geneva wheel, on movement of the cam into engagement with the locking dog, to rotate the wheel after the dog has been disengaged, means for rotating the cam, and means operated by the movement of the arm for moving the cam into and out of operative engagement with the locking dog.

7. In a machine for producing gears, the combination with a rotatable work spindle, an arm oscillatably mounted thereon, and means for oscillating said arm, of an indexing mechanism comprising an index plate and a Geneva wheel, each of which is secured to the work spindle, a locking dog mounted on said arm and adapted to engage a notch of the index plate, a cam rotatably and reciprocably mounted on said arm and adapted to be moved into engagement with the locking dog to release the same, a pin carried by said cam adapted to be moved into operative relation with the Geneva wheel, on movement of the cam into engagement with the locking dog, to rotate the wheel after the dog has been disengaged, means operated by the movement of the arm for rotating the cam in a direction opposite to the direction of movement of the arm, and means for moving the cam into and out of operative engagement with the locking dog.

8. In a machine for producing gears, the combination with a rotatable work spindle, an arm oscillatably mounted thereon, and means for oscillating said arm, of an indexing mechanism comprising an index plate and a Geneva wheel, each of which is secured to the work spindle, a locking dog mounted on said arm and adapted to engage a notch of the index plate, a cam rotatably and reciprocably mounted on said arm and adapted to be moved into engagement with the locking dog to release the same, a pin carried by said cam adapted to be moved into operative relation with the Geneva wheel, on movement of the cam into engagement with the locking dog, to rotate the wheel after the dog has been disengaged, means operated by the arm in its movement for rotating the cam in a direction opposite to the direction of movement of the arm, and means operated by the movement of the arm for moving the cam into and out of operative position.

9. In a machine for producing gears, the combination with a rotatable work spindle, an arm oscillatably mounted thereon, and means for oscillating said arm, of an indexing mechanism comprising an index plate and a Geneva wheel, each of which is secured to the work spindle, a locking dog carried by said arm and adapted to engage a notch of the index plate, a cam rotatably and reciprocably mounted on said arm and adapted to be moved into engagement with the locking dog to release the same, a pin carried by said cam adapted to be moved into operative relation with the Geneva wheel to rotate said wheel after the locking dog has been released, a relatively stationary gear, a gear carried by said arm meshing with the stationary gear and operatively connected with the cam for rotating the cam on rotation of the arm, and means for moving the cam into and out of operative relation with the locking dog.

10. In a machine for producing gears, the combination with a rotatable work spindle, an arm oscillatably mounted thereon, and means for oscillating said arm, of an indexing mechanism comprising an index plate and a Geneva wheel, each of which is secured to the work spindle, a locking dog mounted on said arm and adapted to engage a notch of the index plate, a cam rotatably and reciprocably mounted on the arm and adapted to be moved into engagement with the locking dog to release the same, a pin carried by the cam and adapted to be moved into operative relation with the Geneva wheel to rotate the wheel after the locking dog has been released, a relatively stationary gear, a gear carried by said arm meshing with said stationary gear and operatively connected with the cam for rotating the cam on rotation of the arm, a relatively fixed cam member, and a follower carried by said arm and adapted to engage said cam member and connected to the first named cam to shift the first cam into and out of operative engagement with the locking dog on oscillation of the arm in opposite directions.

11. In an indexing mechanism, a notched plate, a locking dog movable to and from engagement with the plate and adapted, when in engagement with the plate, to hold the plate against rotation, a Geneva wheel operatively connected to the plate, a pin adapted to engage the wheel, means for rotating the pin to rotate the wheel and plate, and means controlling the movement of the dog and pin so that before one of these members is fully disengaged from the part with which it cooperates, the other member will have entered a notch of the part with which it cooperates.

12. In an indexing mechanism, a notched plate having one or more truncated V-shape notches, a locking dog of truncated V-shape movable to and from engagement with the plate and adapted, when in engagement with the plate, to hold the plate against rotation, a Geneva wheel operatively connected to the plate, a pin adapted to rotate the wheel and plate, and means controlling the movement of the dog and pin so that before one of these members is fully disengaged from the part with which it cooperates, the other member will have entered a notch of the part with which it cooperates.

LEONARD O. CARLSEN.